April 1, 1924.
E. FOERSTER
SAW TOOTH
Filed Sept. 16, 1922
1,488,912
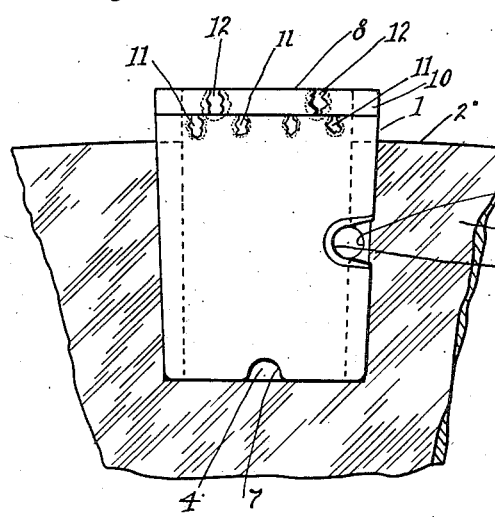
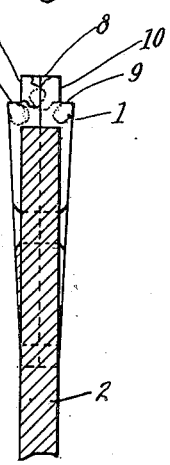
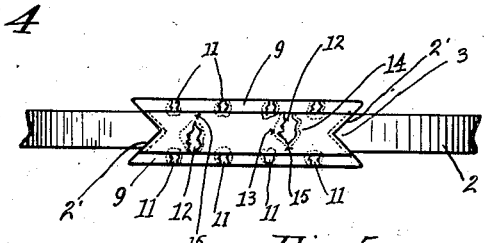
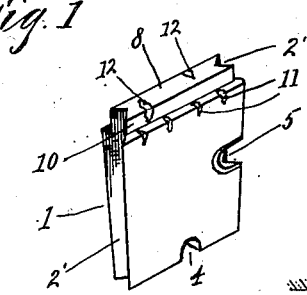
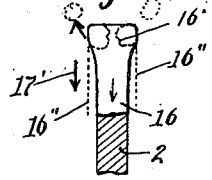
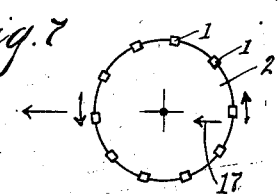
Inventor
Emanuel Foerster
H. S. Johnson
Attorney.

Patented Apr. 1, 1924.

1,488,912

UNITED STATES PATENT OFFICE.

EMANUEL FOERSTER, OF ST. PAUL, MINNESOTA.

SAW TOOTH.

Application filed September 16, 1922. Serial No. 588,598.

*To all whom it may concern:*

Be it known that I, EMANUEL FOERSTER, a citizen of the United States, residing at St. Paul, in the county of Ramsey and State of Minnesota, have invented certain new and useful Improvements in Saw Teeth, of which the following is a specification.

My invention relates to insertable teeth for stone cutting saws, and more particularly to teeth wherein a hard substance is set, to serve as a cutting medium or element, such as diamonds, and has for its main object to provide a tooth, preferably set with diamonds, which will constitute a combined ripping and jointing tooth.

In the art of stone cutting, it is common practice to use a saw having teeth which are set with diamonds of large size for making the initial rough cut, this operation being commonly termed ripping, after which the use of a saw having teeth set with diamonds of smaller size, usually termed splints, is resorted to, for making a secondary or finished cut to smoothen the surface left by the initial cut, which latter is, more or less, rough and uneven. The initially engaging portion of the tooth bears the brunt of the maximum resistance presented by the stone particles, and must, on that account, be constructed with a view to having an adequate quantity of metal in which may be securely and permanently embedded, as large a diamond as is practical, with reference to the thickness of the tooth.

It is an object of my invention to provide a tooth having an initial cutting portion, to remove the main bulk of the cut, and a secondary cutting portion, for protecting the initial cutting portion, said secondary cutting portion consisting of a cutting edge on either side of said initial cutting portion, for simultaneously making a secondary or subsequent finish or jointing cut, thus obviating the use of separate saws, and doing away with a large amount of costly labor, as well as securing better results.

A further advantage of making a combined tooth as described, resides in the saving of labor in its manufacture, in that the usual tempering operations usually resorted to for shrinking the metal around the cutting mediums, in the course of manufacture, are here reduced by half, in that my improved tooth takes the place of two, which must be ordinarily manufactured in its stead.

In the drawings:

Figure 1, represents a perspective view of a tooth embodying my invention.

Figure 2, is an enlarged side view of a section of a circular saw disk, showing my improved tooth mounted thereon.

Figure 3, is an end view of Figure 2.

Figure 4, is a top view of same.

Figure 5, is a view of a fragment of stone, showing the shape of the cut made by my improved tooth in the process of severing a stone.

Figure 6, is a side view of the upper portion of an ordinary tooth, showing how it is worn away at the sides, a portion of the saw body being also shown.

Figure 7, is a diagrammatic front view of a saw, showing the direction of travel; and Figure 8, is a diagrammatic plan view of Figure 7, showing the saw in the cut in a state of rest.

The invention comprises a body portion 1, here shown, thicker at the top than the saw 2, and wedge shaped in form, as is customary, it being wider across the top than at the bottom, as shown, the side edges being formed with the customary V shaped grooves 2', which grooves engage with the V shaped sides 3, of the recess 4 in the edge of the saw. Customarily, the tooth projects about a quarter of an inch beyond the periphery of the saw disk or straight saw blade, as the case may be.

A notch 5, in one side of the tooth, registering with a companion notch 6 in the side of the recess of the saw disk, serves to receive a rivet, not shown, whereby the tooth is anchored in the saw body, as is common in present practice.

A notch 7 in the lower edge of the tooth, serves to receive a wedge shaped tool whereby the tooth may be driven from the recess, when desired.

My improvement consists in forming the top of the tooth with a central ridge, preferably extending in the plane of the tooth the full width thereof, and being preferably rectangular in cross section and of uniform thickness and height.

The top side 8 of the ridge is curved to be concentric with the center of the saw.

Flanking either side of said ridge, are the shoulders 9, extending outwardly, preferably at right angles to the sides 10 of the ridge, which sides are parallel to each other, said shoulders being located, preferably, between the periphery 2″ of the saw body and the top 8 of the tooth, the sum of the width of the two shoulders being less than the thickness of said ridge, whereby I so divide the thickness of the tooth as to secure an ample body of metal in the ridge to adequately hold a diamond sufficiently large in size to withstand the rigors of the work involved in the initial cut. Further, I have found the proportions of the ridge and shoulders, as indicated in the drawings, to bring very satisfactory results, it being important to keep said shoulders quite shallow, so that the secondary or finish cut will involve the removal only of a very thin film of stone, as at "a", Figure 5. This leaves only light work to be done by the small diamonds and makes for conservation of the latter, and permits the use of small bortz (when diamonds constitute the cutting element), or of rough diamonds and splints, which latter are chips broken off of larger diamonds, and are relatively cheap in cost (about one-third as costly as the large diamonds), and preferable because of the sharp edges always present.

As clearly indicated in the drawings, the small diamonds are suitably set to cut a shoulder of the configuration of the shoulder 9, the diamonds being suitably spaced (four being shown on either side), and set by the usual processes. As described, I secure a strong ridge of metal wherein I am enabled to set, in staggered relation, preferably two relatively large diamonds 12, said diamonds extending inwardly, one overlapping the other, with reference to a longitudinal central line of the ridge to effect a cut for the full thickness of the ridge, the size of the diamonds being indicated in the drawings by very fine dotted lines.

In the art of setting diamonds in teeth of this class, it is a distinct advantage, with regard to durability and firm lodgment, to have ample metal around three sides of the diamonds, as, for instance, at 13, 14, and 15 (see Figure 4). By reason of the severity of the work to be performed by these large diamonds, in making the initial cut, it is especially important that the diamonds, owing to their irregular shapes, be firmly embedded. Further, by having the ridge of metal above the shoulders 9, the small diamonds 11 can be so firmly embedded (in that they extend inwardly under said ridge and are thereby braced from above), that I am enabled to safely set from four to six diamonds in a row, thus distributing the light work of scraping the walls of the initial cut, among eight or ten diamonds, thereby securing great endurance. These small diamonds function further to protect the large and quite costly diamonds 12, by preventing what is referred to in the art, as undermining.

Referring to Figure 6, 16 designates the edge of an ordinary diamond tooth which has been in use for some time, the diamonds 16′ being indicated by dotted lines at the top. The dotted lines 16″ indicate the original thickness of the tooth, while the solid lines show how the sides of the tooth have been worn away, and thereby cause the diamonds to overhang.

In Figure 7, the saw 2 revolves from above downwards in the direction of travel in a stone cutting operation, as indicated by the arrows. It is obvious that both sides of the rear edge of the saw and the teeth thereat, will drag during travel in the cut in the direction indicated by the arrow 17, so that the under sides of the diamonds face the direction of travel, thus grinding away the metal, as illustrated in Figure 6. This is due to the fact that the saw disk is customarily purposely slightly dished to the extent of about three-eighths of an inch, in a saw six feet in diameter (Figure 8), and as the saw revolves about four hundred revolutions per minute, it tends to become less concave, or, in other words, to flatten out, but returns to its original shape when in a state of rest. It is with great difficulty that saws of this type can be made to run absolutely true, and it is on this account that the teeth grind away and the diamonds become undermined, as shown in Figure 6. Further, when thus undermined, and the saw is withdrawn from the cut in the direction of the arrow 17′, either in a state of rest, or running at slow speed, the diamonds are very frequently crushed out of their sockets in great numbers and frequently represent total loss.

One of the objects of my invention is to protect the large stones against being undermined. This I accomplish by firmly embedding the small diamonds, as described in the foregoing, and keeping the cut at "a," Figure 5, as light as practicable. While the small diamonds do become slightly undermined, the work they perform is so light that it requires a long period of time to cause these to become dislodged, and when that occurs, the loss sustained is relatively light.

It is to be understood, that my improved saw tooth will be equally effective when used in connection with straight saw blades, in which case the top of the tooth is straight instead of curved. The diamonds may be termed cutting elements, which are harder than the body of the tooth and are permanently embedded therein, it being understood, however, that carborundum or other mediums may be employed in the same manner.

I claim:

1. In a saw tooth of the class described, the combination with a saw body adapted to be actuated to effect a cutting movement and having spaced recesses in its edge, of a tooth, one for each recess, adapted to be inserted and secured therein; of a row of cutting elements for cutting stone, permanently embedded in the body of said tooth, one row on either side thereof, said rows being parallel, and the elements of each row being arranged to bring their cutting edges into parallelism with the recessed edge of said saw body, to make a cut wider than the thickness of said saw body during a cutting movement of the latter, and other cutting elements for cutting stone, of a character suited to perform appreciably heavier work than said first named cutting elements, permanently embedded in the body of said tooth outwardly of and between said first named rows of cutting elements, to make a cut in advance of the cut made by said first named cutting elements.

2. In a saw tooth of the class described, the combination with a saw body adapted to be actuated to effect a cutting movement and having tooth receiving recesses in its edge, of a tooth for each recess adapted to be secured therein, and having a ridge forming the top of the tooth and relatively narrow lateral shoulders on opposite sides of the ridge and set radially inward therefrom, a plurality of coarse diamonds permanently embedded in said ridge in a manner to be flush with the top and sides thereof to effect a cut similar in cross section to the cross section of said ridge, and a plurality of appreciably smaller diamonds permanently embedded in the lateral shoulders of said tooth, flush with the outside thereof and extending under said ridge to be firmly anchored therebeneath.

3. A saw tooth of the class described, for circular saws, comprising in part, an initial and a secondary cutting edge, said initial cutting edge being thinner than said secondary cutting edge, to make an initial cut of less width than is made by said secondary cutting edge, the cuts of both of said cutting edges being coincident, said initial cutting edge including a plurality of cutting elements permanently embedded in staggered relation in the body of the tooth to be flush with the ouside thereof, and said secondary cutting edge including a plurality of appreciably smaller cutting elements permanently embedded in the body of the tooth to be flush with the outside thereof, to thereby form a diamond shield for the initial cutting edge, when the saw is moving in the completed cut in a direction opposed to a stone cutting operation.

In testimony whereof I affix my signature.

EMANUEL FOERSTER.